April 2, 1963 W. G. WEIL ETAL 3,084,087
METHOD OF MAKING A FRAMELESS LAMP SHADE OF
RESIN-IMPREGNATED GLASS FIBER
Filed April 27, 1960
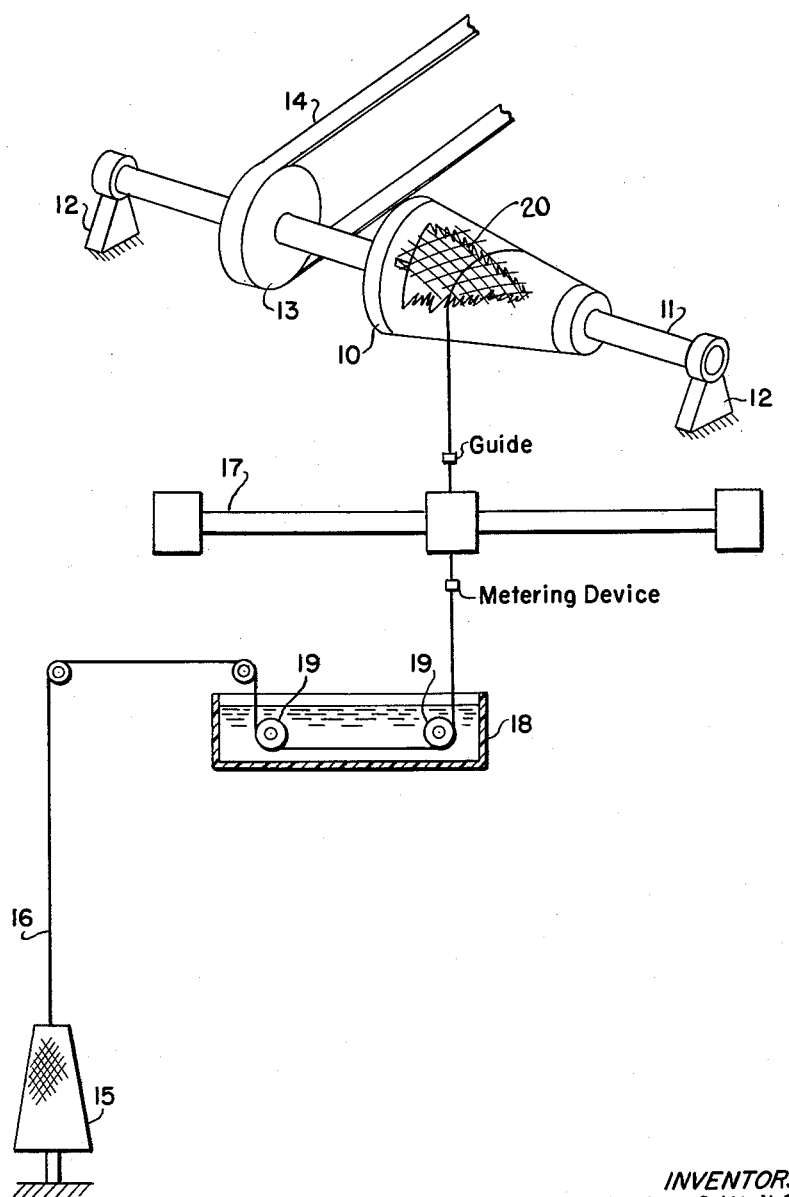
INVENTORS.
Walter G. Weil &
Robert L. Jackson
ATTORNEY.

3,084,087
METHOD OF MAKING A FRAMELESS LAMP SHADE OF RESIN-IMPREGNATED GLASS FIBER
Walter G. Weil, Upper Saddle River, and Robert L. Jackson, Ramsey, N.J.; said Jackson assignor to said Weil
Filed Apr. 27, 1960, Ser. No. 25,083
1 Claim. (Cl. 156—166)

Our invention relates to a method for producing hollow seamless shapes and is directed particularly to a method of fabricating such shapes of reinforced glass fiber particularly in the manufacture of lamp shades and the like.

Lamp shades and similar large hollow objects are presently being made of synthetic plastic materials molded in matched metal die molds. Since such die molds are very costly, tooling for small orders of less than in ten thousand units, for example, of a particular shape is economically impractical.

It is accordingly the principal object of our invention to provide a method of producing such individual shapes economically in quantities of as little as one hundred.

A more particular object of the invention is to provide a method of the character described wherein synthetic resin impregnated glass fiber either in single strand and/or multiple strands of yarn form and is helically wound on a form of the desired shape held in a rotating spindle.

Still another object is to provide a method of the above nature wherein a wide variation in artistic colors and designs can be effected in lamp shades and the like objects by various choices of yarn or strand materials and colors, combined with various helical pitches of the strand wind.

Still another object is to provide a method of the above nature wherein a plurality of spindles can be attended by a single operator in the simultaneous production of a plurality of different shapes, whereby labor cost is radically reduced as compared with previous fabrication methods requiring hand placing, shaping and finishing.

Still another object is to provide a method of the character described wherein the fiber substrate and resin, being applied by mechanical means, can be closely metered to achieve quality, uniformity and cost control within close tolerances. The method also allows for hand working of the formed units, if necessary, before curing, whereby rejects can be kept to an absolute minimum.

Yet another object is to provide an improved resin reinforced glass fiber manufacturing process wherein high media loading in excess of 50% can be effected for high strength properties, and wherein the loading can readily be varied to obtain different finishes and strength characteristics as may be required in the finished product.

Other objects, features and advantages of the invention will be apparent from the following description when read with reference to the accompanying drawing illustrating in the single FIGURE a simplified mechanism for carrying out the process embodying the invention.

In FIG. 1, 10 designates a form, which may be of wood, for example, for a lamp shade in the shape of a conic frustum, which is thus of circular cross-section perpendicular to its axis at any point therealong. The form 10 is supported for rotation on a spindle 11 journalled in journal blocks 12. The spindle 11 may be rotated in the direction indicated by a pulley 13 by a motor (not illustrated) through belt 14 (partially shown). A supply spool 15 of glass yarn or strand 16 is guided over a traversing and tensioning mechanism, generally indicated at 17, whence it passes down into a synthetic resin supply tank 18 under guide rollers 19, and up to the form 10. As the form 10 rotates, the traversing mechanism 17 moves the yarn or strand 16 back and forth along the form to build up a hollow lamp shade or similar article of resin reinforced glass fiber having the woven appearance shown in the drawing. After completion of the wind at desired thickness of the article, the latter is then cured, to result in an exceptionally strong shape suitable for conical lamp shades. It will be apparent that increasing the helical pitch of the wind will increase the tensile strength along its axis of rotation of the finished article. Variations of the resin, traversing pitch, and colors of the strand or yarn can produce a great variety of artistic effects and appearance in the finished product without additional tooling costs and with a minimum of set-up time. For example, colored and incompatible resins can be introduced both below and on the surface of the article being wound to produce unusual harlequin and stained effects. Nylon and metallic yarns can also be used to create unusual decorative effects. Inserts (such as the cut-out tree 20) can be applied both below and on the surface of the article while being fabricated for decorating purposes.

While we have described and illustrated herein one form in which the method embodying the present invention can be practiced, it is to be understood that this example is presented by way of example only, and not in a limiting sense. The invention, in brief, is limited only by the scope and spirit of the following claim.

What we claim as new and desire to secure by Letters Patent is:

The method of forming a frameless lamp shade which comprises rotating a longitudinally tapered form, of constantly circular transverse cross sections, about its longitudinal axis, coating a glass fiber strand with synthetic resinous material, helically winding said coated strand repeatedly from end to end around said form with a selected relatively wide pitch for increasing the longitudinal tensile strength of the shade and imparting a helical crisscross woven appearance design thereto, applying decorative inserts below the surface of said shade while being wound and curing the wound shade.

References Cited in the file of this patent

UNITED STATES PATENTS

| | | |
|---|---|---|
| 2,614,058 | Francis | Oct. 14, 1952 |
| 2,656,873 | Stephens | Oct. 27, 1953 |
| 2,664,375 | Slayter | Dec. 29, 1953 |
| 2,718,583 | Noland et al. | Sept. 20, 1955 |
| 2,792,324 | Daley et al. | May 14, 1957 |
| 2,905,578 | Rees et al. | Sept. 22, 1959 |

FOREIGN PATENTS

| | | |
|---|---|---|
| 71,511 | Denmark | Sept. 11, 1950 |
| 653,615 | Great Britain | May 23, 1951 |
| 823,150 | Great Britain | Nov. 4, 1959 |
| 1,112,571 | France | Nov. 16, 1955 |
| 1,150,927 | France | Aug. 19, 1957 |